US008949910B2

(12) United States Patent
Meredith et al.

(10) Patent No.: US 8,949,910 B2

(45) Date of Patent: Feb. 3, 2015

(54) APPARATUS AND METHOD FOR MEDIA CONTENT PRESENTATION

(71) Applicant: AT&T Mobility II, LLC., Atlanta, GA (US)

(72) Inventors: Sheldon Kent Meredith, Marietta, GA (US); Jeremy Fix, Acworth, GA (US); Zachary Meredith, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/657,272

(22) Filed: Oct. 22, 2012

(65) Prior Publication Data

US 2014/0115643 A1 Apr. 24, 2014

(51) Int. Cl.

| | |
|---|---|
| ***G06F 3/00*** | (2006.01) |
| ***G06F 13/00*** | (2006.01) |
| ***H04N 5/445*** | (2011.01) |
| ***H04N 7/18*** | (2006.01) |

(52) U.S. Cl.

USPC .................. 725/80; 725/37; 725/38; 725/39; 725/44; 725/48; 725/60; 725/61; 725/74; 725/78

(58) Field of Classification Search

None

See application file for complete search history.

(56) References Cited

U.S. PATENT DOCUMENTS

| | | | | |
|---|---|---|---|---|
| 6,118,493 | A | 9/2000 | Duhault et al. | |
| 7,652,722 | B2 | 1/2010 | Kim | |
| 2002/0108125 | A1 * | 8/2002 | Joao | 725/139 |
| 2004/0055006 | A1 * | 3/2004 | Iwamura | 725/37 |
| 2005/0117910 | A1 | 6/2005 | Foote et al. | |
| 2008/0120675 | A1 * | 5/2008 | Morad et al. | 725/120 |
| 2008/0148331 | A1 * | 6/2008 | Walter et al. | 725/110 |
| 2009/0123136 | A1 * | 5/2009 | Bernsley | 386/126 |
| 2009/0172727 | A1 * | 7/2009 | Baluja et al. | 725/34 |
| 2009/0282437 | A1 * | 11/2009 | Malec et al. | 725/40 |
| 2010/0306306 | A1 | 12/2010 | Kamay | |
| 2011/0302610 | A1 * | 12/2011 | Karaoguz et al. | 725/46 |

* cited by examiner

*Primary Examiner* — Justin Shepard

(74) *Attorney, Agent, or Firm* — Guntin & Gust, PLC; Joseph Hrutka

(57) ABSTRACT

A method that incorporates teachings of the subject disclosure may include, for example, accessing, by a system comprising at least one processor, a content display configuration corresponding to a plurality of feed selections from a plurality of media content feeds available from a service provider network, a plurality of display selections from a plurality of available displays, and a plurality of pairing selections assigning each feed selection of the plurality of feed selections to at least one display selection of the plurality of display selections, transmitting a plurality of displayable content streams according to the content display configuration, modifying the content display configuration according to a request, and transmitting the plurality of displayable content streams according to the content display configuration. Other embodiments are disclosed.

20 Claims, 7 Drawing Sheets

Media Content Source
550
130
545
250
Media Server
IMS Network
530
540
Gateway
104
540
545
106
107
STB
560A
560D
108A
108D
560B
560E
108B
108E
560C
560F
108C
108F
500

100

SHO
111
SHS
110
130
162
VHO 1
VHO 2
VHO 3
VHO 4
VHO 5
VHO 6
112
ISP Network 132
114
VHS
118
ACCESS NETWORK
129
115
117
119
Satellite dish receiver 131
108
166
STB 106
G 104
Ctrl 107
116
ISP Ntwk 132
STB 106
Cable TV 133
164
102
108
Remote Services

300

400

600

700

APPARATUS AND METHOD FOR MEDIA CONTENT PRESENTATION

FIELD OF THE DISCLOSURE

The subject disclosure relates generally to media content presentation and more specifically to an apparatus and method for media content presentation.

BACKGROUND

Media content is typically experienced by consumers via devices such as computers, televisions, radios, and mobile electronics. Media content is frequently delivered by service providers, who send the content, such as television, radio, and video programming, directly to consumers for enjoyment at their physical locations. Modern communication networks benefit from interconnectivity between consumers and various communication devices. Consumers typically experience media content over a display or presentation device. As network capabilities expand, these interconnections provide new opportunities to enhance abilities to enjoy media content by experiencing a variety of content over multiple devices.

BRIEF DESCRIPTION OF THE DRAWINGS

Reference will now be made to the accompanying drawings, which are not necessarily drawn to scale, and wherein.

DETAILED DESCRIPTION

Figure 1:
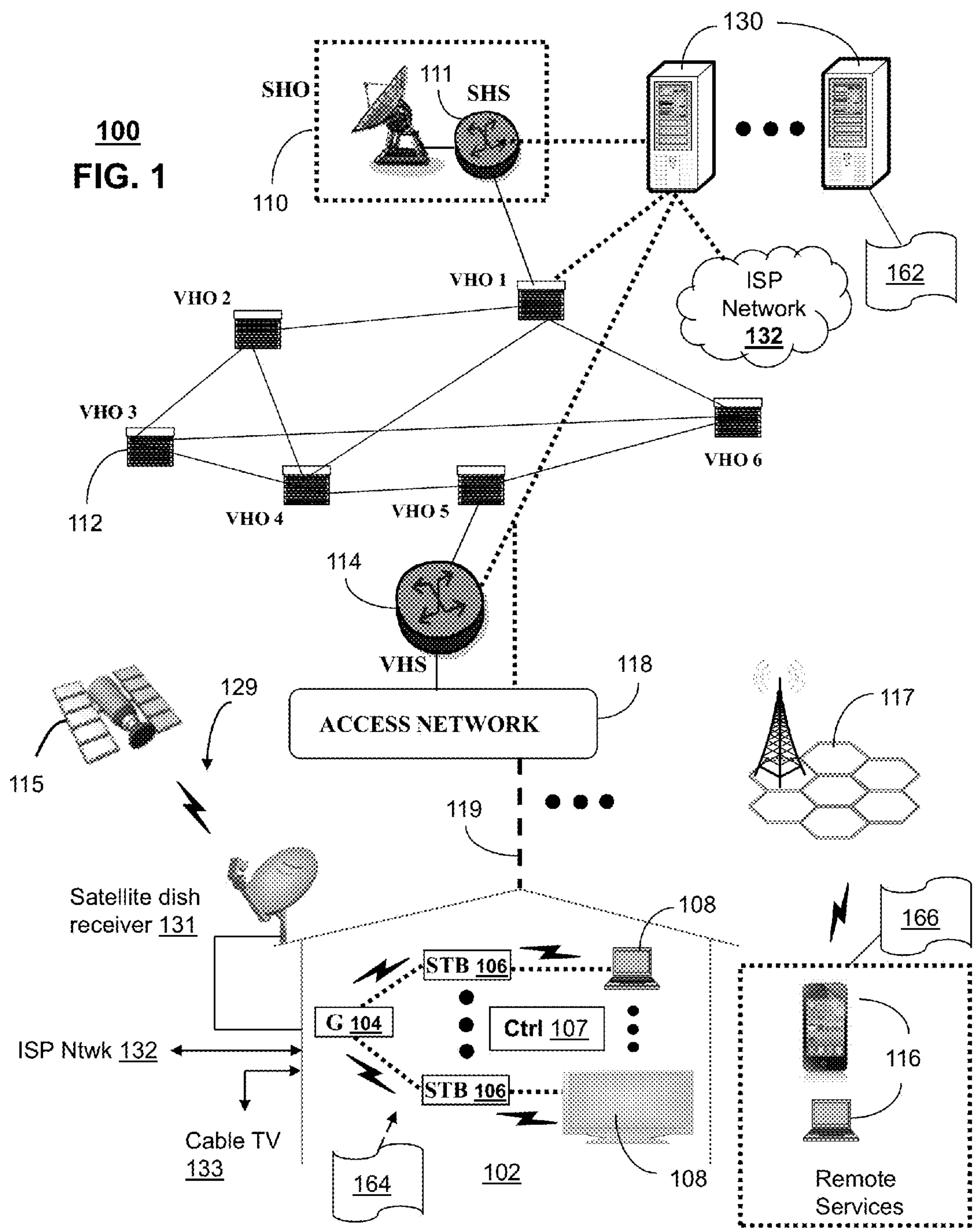
FIGS. 1-2 depict illustrative embodiments of communication systems that provide media services.

The subject disclosure describes, among other things, illustrative embodiments of a system and a method for media content presentation, where displayable content streams are transmitting to selected displays according to a content display configuration and where the content display configuration can be modified. Other embodiments are contemplated by the subject disclosure.

One embodiment of the subject disclosure includes a memory storing computer instructions and a processor coupled to the memory. The processor can perform operations responsive to executing the computer instructions including receiving a plurality of feed selections from a first listing of a plurality of media content feeds available from a service provider network. The processor can perform operations for receiving a plurality of display selections from a second listing of a plurality of displays that are communicatively coupled to the device. The processor can also perform operations for receiving a plurality of pairing selections. Each pairing selection of the plurality of pairing selections can include an assignment of one feed selection of the plurality of feed selections to one display selection of the plurality of display selections. The processor can perform operations for generating a content display configuration corresponding to the plurality of feed selections, the plurality of display selections, and the plurality of pairing selections. The processor can perform operations for transmitting a plurality of displayable content streams according to the content display configuration. The processor can also perform operations for modifying the content display configuration according to a received request to modify the content display configuration and transmitting the plurality of displayable content streams according to the modified content display configuration.

One embodiment of the subject disclosure includes computer instructions, which, responsive to being executed by at least one processor, can cause the at least one processor to perform operations including accessing a content display configuration corresponding to a plurality of feed selections from a plurality of media content feeds available from a service provider network, a plurality of display selections from a plurality of available displays, and a plurality of pairing selections assigning each feed selection of the plurality of feed selections to at least one display selection of the plurality of display selections. The computer instructions can cause the at least one processor to perform operations for receiving from the service provider network a plurality of content streams according to the content display configuration, decoding the received plurality of content streams to generate a plurality of displayable content streams, and, in turn, transmitting the plurality of displayable content streams according to the content display configuration. The computer instructions can cause the at least one processor to perform operations for receiving, during the transmitting of the plurality of displayable content streams, a request to modify the content display configuration, modifying the content display configuration according to the request, and transmitting the plurality of displayable content streams according to the modified content display configuration.

One embodiment of the subject disclosure includes a method including accessing, by a system comprising at least one processor, a content display configuration corresponding to a plurality of feed selections from a plurality of media content feeds available from a service provider network, a plurality of display selections from a plurality of available displays, and a plurality of pairing selections assigning each feed selection of the plurality of feed selections to at least one display selection of the plurality of display selections. The method also includes transmitting, by the system, a plurality of displayable content streams according to the content display configuration. The method further includes modifying, by the system, the content display configuration according to at least one request and transmitting, by the system, the plurality of displayable content streams according to the content display configuration.

FIG. 1 depicts an illustrative embodiment of a first communication system 100 for delivering media content. The communication system 100 can represent an Internet Protocol Television (IPTV) media system. Communication system 100 can also provide for all or a portion of the computing devices 130 to function as a media server (herein referred to as media server 130). The media server 130 can use computing and communication technology to perform function 162, which can include among things, receiving media content from, for example, the super head end office server 111 for distribution through the system 100. The media server 130 can receive media content feeds 530 one or more media content sources. The media server 130 can receive a large number of media feeds from several sources. The media server 130 can categorize the received media feeds to create a series of collections of media content feeds based on the media source or based upon some element of the subject matter of the media feed. This media processor 130 can present collections of feeds to subscribers of the network 100 for selection and viewing.

The media server 130 can present the collection of media feeds to subscribers via an electronic programming guide (EPG). The EPG 545 can include listings of the collections of media content, as well as non-collected media content, which are available at the media processor device 106 from the media server 130. The media server 130 can generate collections of media feeds and/or receive collections of media feeds from the media content sources and can transmit the media content of the collections as content streams to media processor devices 106 by way of the network 100 and/or a gateway device 104.

The media processor devices 106 and wireless communication devices 116 can be adapted with software functions 164 and 166, respectively, to utilize the services of media server 130. The media processor devices 106 can receive selections of feeds for display from the feed collections. The media processor devices 106 can receive selections of one or more media devices 108 for presenting the selected feeds. The media processor devices 106 can receive pairing selections that pair feed selections to display selections. The media processor devices 106 can generate content display configurations based on the feed selections, the display selections, and the pairing selections, to allow the media processor devices 106 to receive, decode, and transmit the selected feeds to the selected displays. The media processor devices 106 can received and process requests for modifying the content display configurations to enable users to function as producers or directors of media content available from the service provider.

The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used in the media system of FIG. 1. The satellite broadcast television system can be overlaid, operably coupled with, or replace the IPTV system as another representative embodiment of communication system 100. In this embodiment, signals transmitted by a satellite 115 that include media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to an Internet Service Provider (ISP) network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the subject disclosure can apply to other present or next generation over-the-air and/or landline media content services system.

Some of the network elements of the IPTV media system can be coupled to one or more computing devices 130, a portion of which can operate as a web server for providing web portal services over the ISP network 132 to wireline media devices 108 or wireless communication devices 116.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies are contemplated by the subject disclosure.

Figure 2:
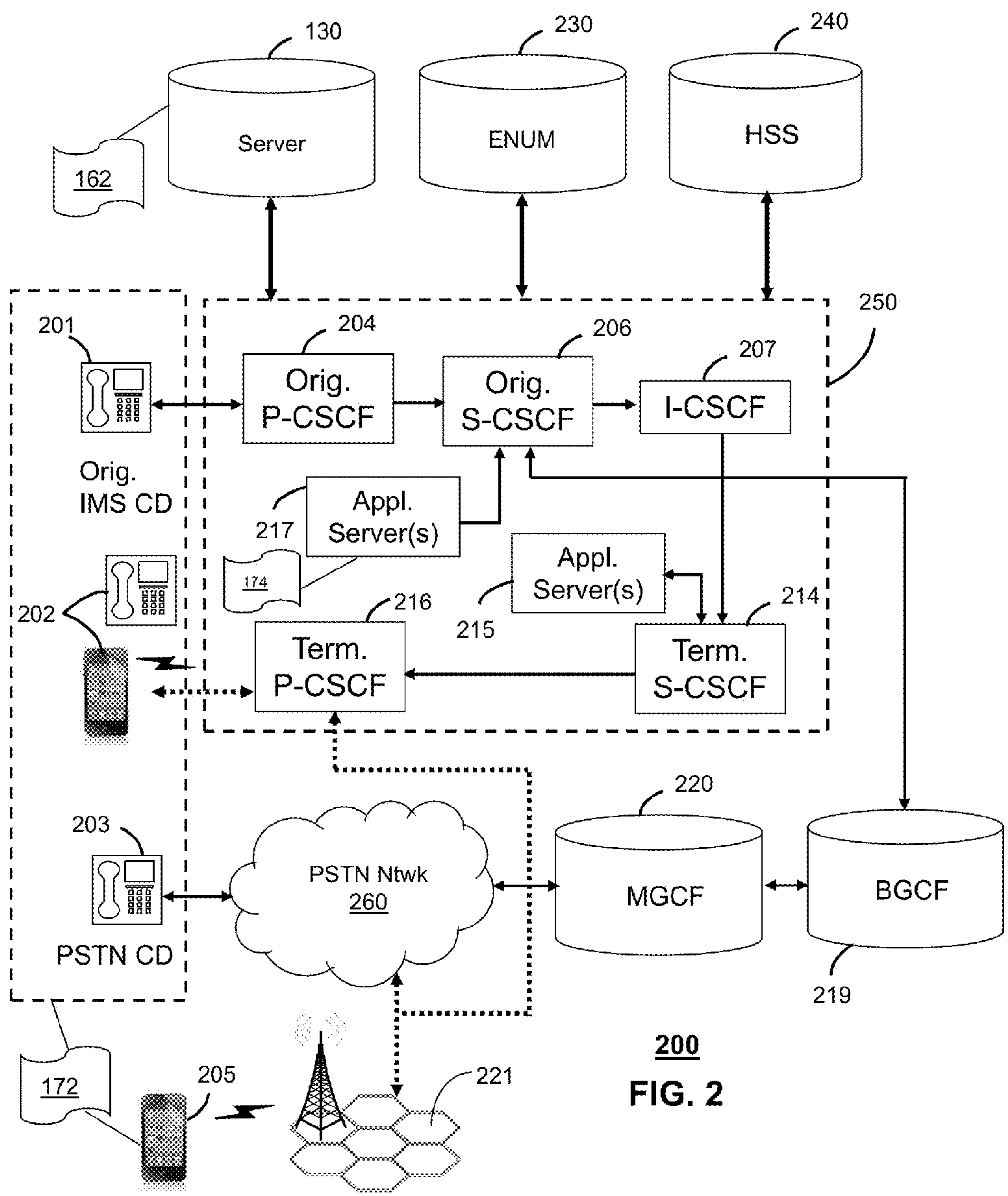

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms “originating” and “terminating” in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a Digital Enhanced Cordless Telecommunications (DECT) base unit, or another suitable wireless access unit to establish communications with the IMS network 250 of FIG. 2. The cellular access base station 221 can operate according to common wireless access protocols such as GSM, CDMA, TDMA, UMTS, WiMax, SDR, LTE, and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media server 130 of FIG. 1 can be operably coupled to the second communication system 200 for purposes similar to those described above. It is further contemplated by the subject disclosure that media server 130 can perform function 162 and thereby provide services to the CDs 201, 202, 203 and 205 of FIG. 2. CDs 201, 202, 203 and 205, which can be adapted with software to perform function 172 to utilize the services of the media server 130. It is further contemplated that the media server 130 can be an integral part of the application server(s) 217 performing function 174, which can be substantially similar to function 162 and adapted to the operations of the IMS network 250.

Figure 3:
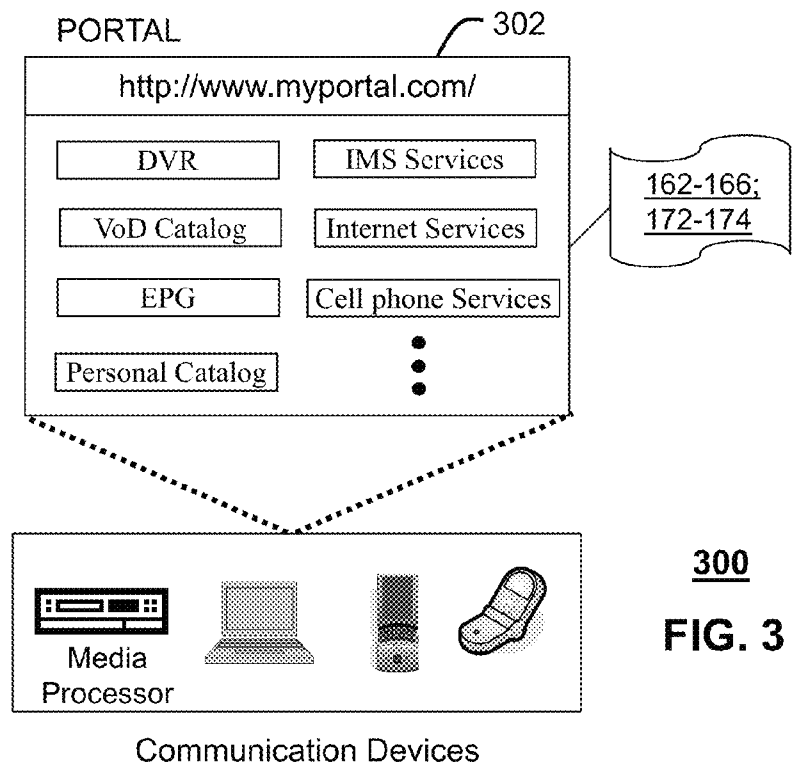
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft’s Internet Explorer™, Mozilla’s Firefox™, Apple’s Safari™, or Google’s Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can further be utilized to manage and provision software applications 162-166, and 172-174, such as transmitting and/or receiving streamed media content, and to adapt these applications as may be desired by subscribers and service providers of communication systems 100-200.

Figure 4:
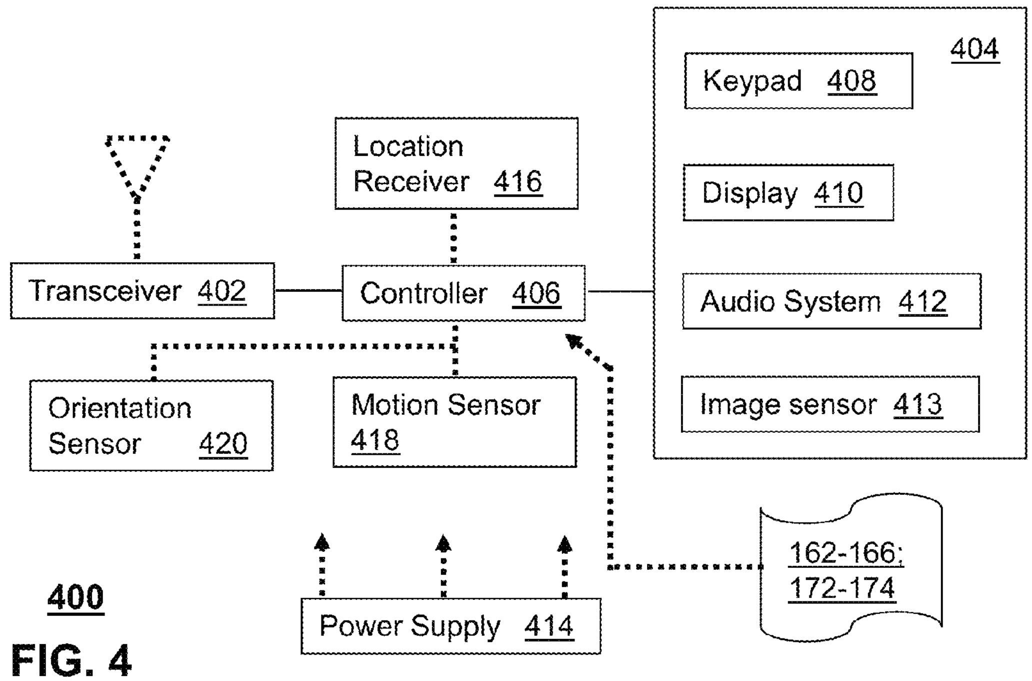
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. These variant embodiments are contemplated by the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other devices that can operate in communication systems 100-200 of FIGS. 1-2 such as a gaming console and a media player.

It is contemplated by the subject disclosure that the communication device 400 shown in FIG. 4 or portions thereof can serve as a representation of one or more of the devices of communication systems 100-200. It is further contemplated that the controller 406 can be adapted in various embodiments to perform the functions 162-166 and 172-174, such as transmitting and/or receiving streamed media content.

Figure 5:
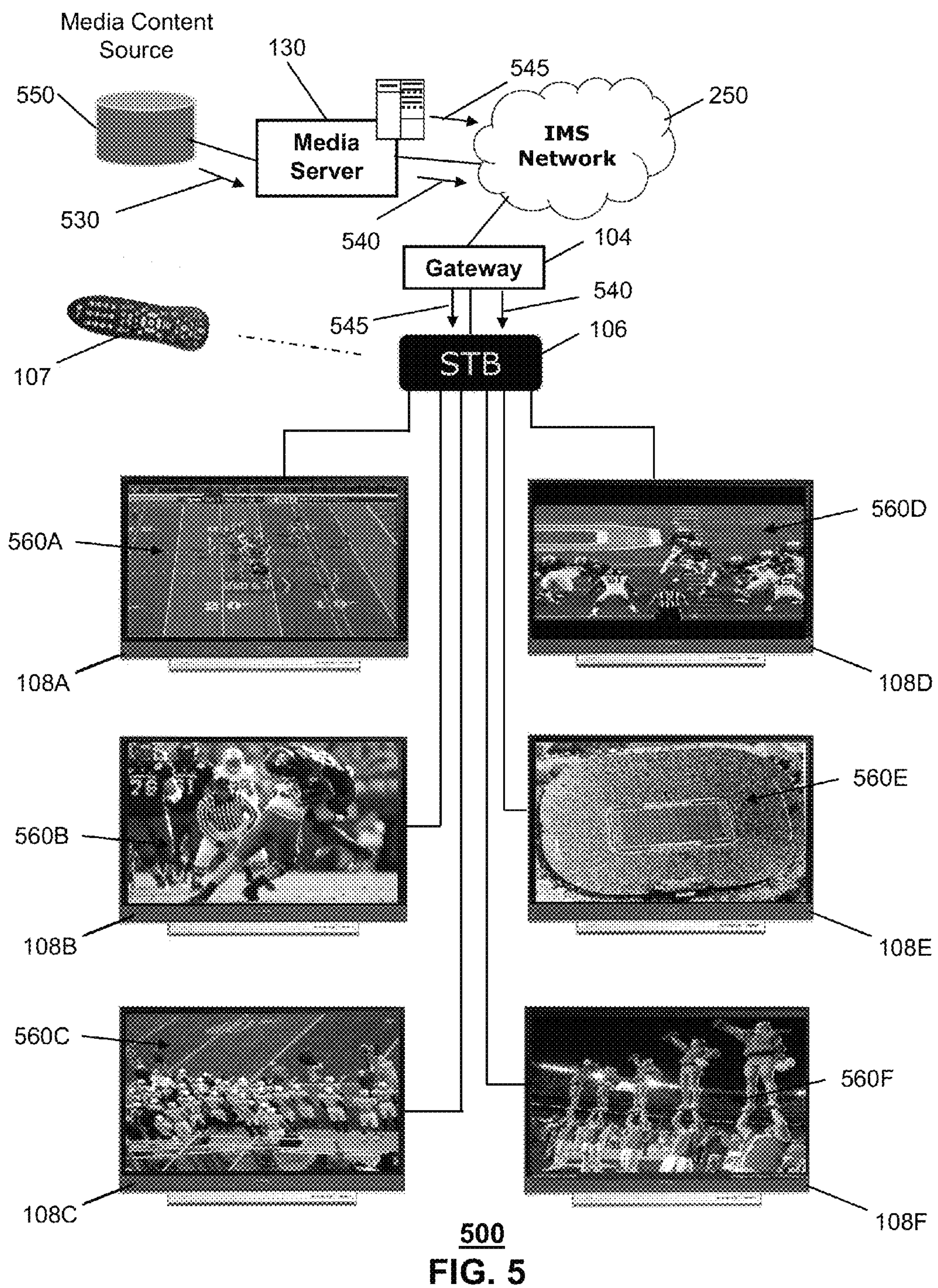
FIGS. 5-6 depict an illustrative embodiments of a communication system that performs media content presentation.

FIG. 5 depicts an illustrative embodiment of a communication system 500 for providing media content. System 500 can be overlaid or operably coupled to communication systems 100-200 as another representative embodiment of communication systems 100-200. System 500 can include a media server 130 in communication with a packet switched network such as IMS network 250. The media server 130 can be in communication with a media processor 106, such as set-top box, that is further in communication with several media devices 108A-F. The media devices 108A-F can be televisions, display panels, computer devices, mobile communication devices, projection display devices, and/or combinations of such devices. The media server 130 can provide media content, by way of media content streams 540, to the media processor device 106.

In one embodiment, the media server 130 can receive media content feeds 530 one or more media content sources 550. The media content feeds 530 can be associated with one media source 550, a number of sources, and/or the subject matter the received media content feeds 530. For example, a content feed 530 from a broadcast network can be associated with that network, such as the ABC™ television network, or can be associated with the subject matter of a particular program, such as "Grey's Anatomy." The media server 130 can receive a large number of media feeds 530 from several sources 550. The media server 130 can categorize the received media feeds 530 to create a series of collections of media content feeds based on the media source 550 or based upon some element of the subject matter of the media feed.

To continue the earlier examples, the media server can create a collection with all media feeds 550 source from the ABC™ television network. For example, the ABC™ television network can broadcast a series of national feeds corresponding to a series of time zones. (e.g., ABCEast for the eastern time zone, ABCCentral for the Central time zone, ABCWest for the Pacific time zone, etc.). The media server 130 can collect the several national feeds into a single collection, based on the common media source 550. The collected feeds can be presented to subscribers of the network 500 for selection as a collection labeled, "ABC National Feeds." As another example, the ABC™ television network can broadcast a new episode of the program, "Grey's Anatomy," while a cable network provider broadcasts a re-run of a prior episode of "Grey's Anatomy," and while an Internet Protocol site broadcasts a behind-the-scenes interview with the creators of "Grey's Anatomy." The media server 130 can collect the various "Grey's Anatomy" media content into a collection, called "Grey's Anatomy Central." This subject matter-based collection can also be presented to subscribers of the network 500 for selection and viewing. In one embodiment, the media source 550 can provide the media content feeds 530 as pre-assembled collections of media feeds 530. For example, the ABC™ television network can provide the "ABC National Feeds" or the "Grey's Anatomy Central" to the media server 130 collections as pre-packaged collections.

In one embodiment, the media server 130 can further present the collection of media feeds to subscribers via an electronic programming guide (EPG). A subscriber can peruse the EPG to view a listing of several such collections. The EPG can include collections for general subject areas, such as "movies" or "news," or for more specific sources or subject areas, such as collections associated with a single sporting event or a single television series or a single political campaign. For example, a media source 550 can generate a collection of media feeds 530 where each feed is associated with a broadcast of a live sporting event. For example, a broadcast of a professional or college football game can require the use of many individual cameras, each filming different aspects of the game from different vantage points. As a further example, a first media feed 560A can correspond to a signal from a first camera filming the game from a line of scrimmage side view, while a second media feed 560B can correspond to a second camera filming the game from a field level view, and other media feeds 560C, 560D, 560E, and 560F, can correspond to other views of the game action, such as a sideline view, end zone view, overhead view, or cheerleading view, respectively. The subject matter of a subject area can be collected in to a subject matter channel that can, itself, be a collection of sub-channels. For example, a "Grey's Anatomy" channel can be a collection of sub-channel, each directed to some aspect of the series.

The media server 130 can generate collections of media feeds 530 and/or receive collections of media feeds 530 from the media content sources 550. In one embodiment, the media server 130 can transmit the media content of the collections as content streams 540 to the media processor device 106 by way of the IMS network 250 and/or a gateway device 104. In one embodiment, the media server 130 can transmit an electronic programming guide (EPG) 545 to the media processor device 106. The EPG 545 can include listings of the collections of media content, as well as non-collected media content, which are available at the media processor device 106 from the media server 130. In one embodiment, the EPG 545 can display only collections and/or content available to the media processor device 106, where this availability depends on subscription factors. For example, a media processor device 106 can have an access to certain football game collections based on a geographic location of the media processor device 106 or based on a purchase of a game package. In another embodiment, the EPG 545 can be configured to only display collections and/or content permitted for a current user of the media processor device 106. For example, an adult user of the media processor device 106 can configure the device 106 to block listings of collections or content associated with adult entertainment unless an authorization password is provided.

In one embodiment, a user of the media processor device 106 can select items from the collections of media content for viewing at one or more media devices 108A-F that are coupled to the media processor device 106. In one embodiment, the items can be selected using a remote controller 107 that interacts with the media processor device 106. In one embodiment, the user can select an entire collection of media content for viewing. For example, if the media processor device 106 is configured for controlling six media devices 108A-F, as shown, then the user can select and display up to media content feeds from a collection for simultaneous viewing. In one embodiment, the user can select one or more media content feeds from a collection and have these feeds recorded at the media processor device 106 for later playback. If a collection contains more media feeds than can be displayed and/or recorded simultaneously, then the user can select, at most, only a portion of the feeds from that collection. In one embodiment, the user can select one or more feeds from a first collection and one or more feeds from one or more other collections. The user can make a set of feed selections that incorporate user needs and preferences from among all the available choices provided to the media processor device 106.

In one embodiment, the media processor device can also receive selections of media devices 108A-F for presenting the feed selections. In one embodiment, a user can input a set of display selections to identify which of the media devices 108A-F will be transmitted displayable media content from the set of feed selections. In one embodiment, the display selections can be received at the media processor device 106 using a remote controller 107. In one embodiment, the media processor device 106 can present the set of feed selections according to a default display order. For example, if a user has selected a set of feed selections made up of three feeds, then the media processor device 106 can transmit these three feed selections to the first three media devices ports (ports 1, 2, and 3) of the media processor device 106. In another embodiment, the media processor device 106 can present the three feed selections at the first three media devices where media devices 108A-F are detected as present and activated. So, if active media devices are detected at ports 1, 4, 5, and 6 of the media processor device 106, then the media processor device 106 can automatically send the three feed selections to the first three active ports—ports 1, 4, and 5. In one embodiment, the media processor device 106 can receive a set of display selections from the user. For example, the user can select the set of media devices 108B, 108C, and 108E, to receive displayable content from a set of feed selections.

In one embodiment, the user can make a series of pairing selections at the media processor device 106. In each pairing selection, a feed of the set of feed selections is assigned a media device 108A-F of the set of display selections. For example, a user may have selected media feeds from a football game collection corresponding to a line of scrimmage feed 560A, an on field feed 560B, a sideline feed 560C, an end zone feed 560D, an overhead feed 560E, and a cheerleader feed 560F. The user may have identified a set of selected displays including all of the available media devices 108A-F for presenting the feed selections. The user can identify a set of selected pairings where the line of scrimmage feed 560A is paired with the first media device 108A, the on field feed 560B is paired with the second media device 108B, the sideline feed 560C is paired with the third media device 108C, the end zone feed 560D is paired with the fourth media device 108D, the overhead feed 560E is paired with the fifth media device 108E, and the cheerleader feed is paired with the sixth media device 108F. In one embodiment, the media processor device 106 can receive the set of display selections and the set of pairing selection through the EPG. For example, the EPG can be configured to present a display selection window upon the entry of a user command or selection from the remote controller 107. In another example, the EPG can be configured to present a display selection window whenever a user selects a program for viewing at the EPG. In another example, the EPG can present a pairing selection window whenever the user selects a program for display.

In one embodiment, the set of feed selections, display selections, and pairing selections can be combined to form content display configuration at the media processor device 106. In one embodiment, the media processor device 106 can receive media content feeds 540 from the media server 130 according to the content display configuration. The media server 130 can transmit to the media processor device 106 the set of feed selections 540 defined in the content display configuration. In one embodiment, the media processor device 106 can decode the received media content feeds 540 to generate display content streams that are then transmitted to each of the media devices 108A-F as governed by the content display configuration.

The ability to make feed, or sub-channel, selections from one or more subject matter area, and, then, to pair these feed selections with a set of display selections, allows a user or subscriber to act as a virtual video director or producer. Virtualization of media content selection and presentation device control, via, for example, a remote control device or a mobile communication device, allows the user/subscriber to generate a limitless number of configurations. In one embodiment, the user/subscribed can direct the selection of sub-channels or feeds, display devices, as wells as pairing between these selections, can be performed using voice commands. For example, a remote control device, media processor device, or a mobile communication device can capture voice commands and can convert these voice commands into executable instructions. In one embodiment, one or more user configurations can be generated and saved for each user/subscriber to the processing device. For example, a set of feed selections and display selections can be stored in a configuration. The configuration can be stored for later retrieval and usage.

Figure 6:
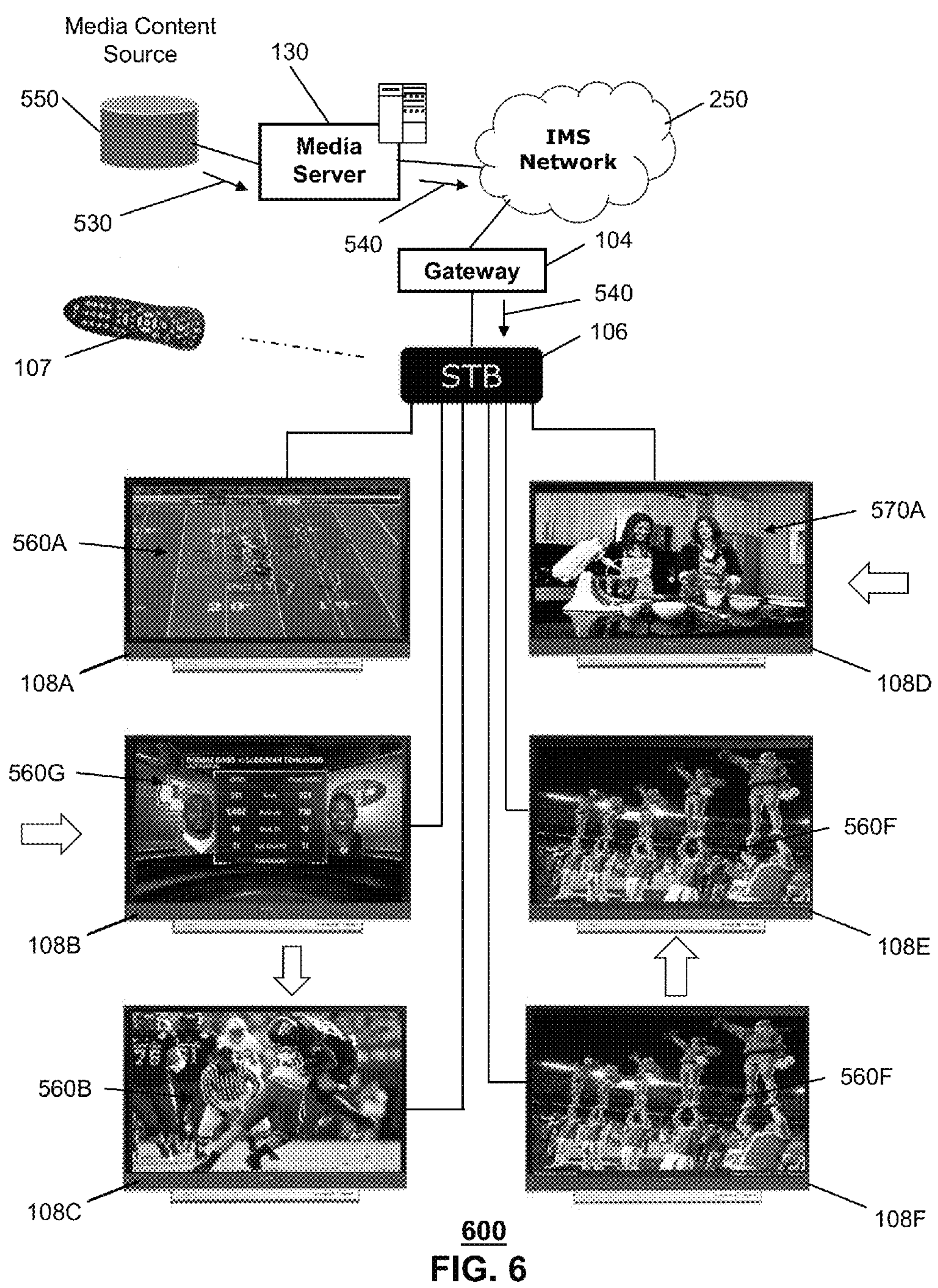

Referring to FIG. 6, in one embodiment, the media processor device 106 can receive further a request from a user to modify the content display configuration. For example, the user can request a modification by entering a command or selection at the remote controller 107. In one embodiment, the requested modification can be a request to change a feed selection. For example, the user can request that a different available feed from a collection be substituted for a feed presently being used. In one embodiment, a user can request that a studio feed 560G of the football game collection be substituted for another feed, such as the field level feed 560B. The media processor device 106 can, in turn, request the studio feed 560G from the media server 130. In one embodiment, the requested modification can be a request to change a display selection. For example, the user can request that one of the media devices 108A-F be disable or that another device be enabled. In one embodiment, the requested modification can be to modify one of the pairing selections. For example, the user can request that the field level feed 560B be reassigned to a pairing with the third media device 108C. In one embodiment, the requested modification can include a combination of modifications to the sets of feed selections, display selections, and pairing selections. For example, the overhead feed 560E that was paired with the fifth media device 108E can be removed from the set of feed selections, while the cheerleader feed 560F can be paired to a second media device 108E. In another embodiment a feed from a different collection can be substituted for an existing feed. For example, a cooking show feed 570A from a different collection can be substituted for the end zone feed 560D. The combination of modifications allow the user of the media processor device 106 to perform functions of a virtual producer or director while controlling content and display location for any content available for display from the service provider network 500.

Figure 7:
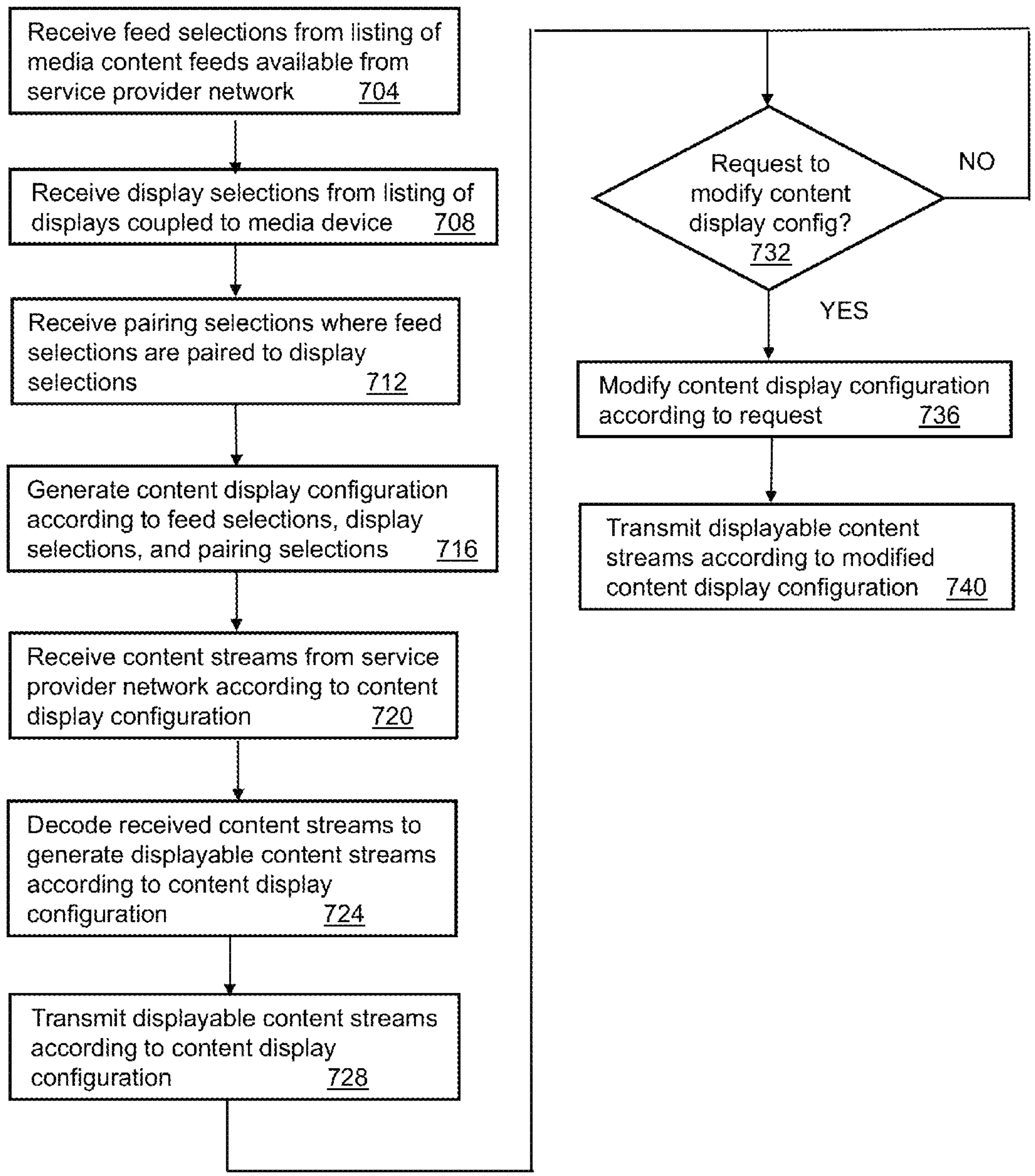
FIG. 7 depicts an illustrative embodiment of a method operating in portions of the systems described in FIGS. 1-5.

FIG. 7 depicts an illustrative method 700 that operates in portions of the devices of FIGS. 1-5. Method 600 can begin with step 704 in which feed selections can be received at the media processor device 106. In one embodiment, the feed selections can be received from a listing of available media content, where the listing is displayed at a media device 108A under the control of the media processor device 106. In one embodiment the received selections form a set of feed selections that can be incorporated into a content display configuration for the media processor device 106 in step 716. In one embodiment, the feed selections can be selected via user interaction with an EPG that is graphically displayed at a media device 108A. In step 708, the media processor device 106 can receive display selections. In one embodiment, the display selections can be received via user command and/or selections based upon a listing of available displays. In one embodiment, the display selections can include both user-selected displays and default displays (selected according to media processor device configurations).

In step 712, pairing selections can be received at the media processor device 106. In one embodiment, the pairing selections are received based upon user inputs, selections, and/or commands entered with respect to a listing that presents the feed selections and the display selections to the user. In one embodiment, the pairing selections and the display selections can be entered, selected, and/or commanded as part of a common operating step. In step 716, the media processor device 106 can generate a content display configuration based on the selections of the feeds, the displays, and the pairings. In one embodiment, the content display configuration can be generated by the user selections of feeds, displays, and pairings combined with other configuration data associated with the media processor device 106, a user of the media processor device 106, and/or the media server.

In step 720, the media processor device 106 can receive the feed selections 540 from the media server according to the content display configuration. In step 724, the media processor device 106 can decode the received feed selections and can generate displayable content streams for transmission to the media devices 108A-F of the set of display selections in step 728. In step 732, the media processor device 106 can determine if a request has been received for a modification of the content display configuration. In one embodiment, the media processor device 106 can monitor for selections from a remote controller 107. In another embodiment, the media processor device 106 can monitor for requests from the service provider, which can further be originated using a portal access to the service provider network 500. In step 736, where the media processor device 106 has detected a request, the content display configuration can be modified according to the request. In one embodiment, the modification of the content display configuration can result in modification of the set of feed selections, the set of display selections, the set of pairing selections, and/or any combination thereof. In step 740, the media processor device 106 transmits displayable content according to the modified content display configuration.

Upon reviewing the aforementioned embodiments, it would be evident to an artisan with ordinary skill in the art that said embodiments can be modified, reduced, or enhanced without departing from the scope and spirit of the claims described below. For example, one or more media devices 108A-F can be coupled to the media processor device 106 by wireless communication links. In one embodiment, the content display configuration can be stored periodically or shut down of the media processor device 106. In another embodiment, a set of content display configurations can be stored for each user of the media processor device 106 or each user of a remote controller 107. In another embodiment, a stored content display configuration can be loaded at the media processor device 106 upon initialization of the device 106 or upon detection of a change of user.

In one embodiment, one or more of the feed selections of the set of feed selections are made according to a content display configuration that is accessed from memory. In one embodiment, one or more of the display selections of the set of display selections are made according to a content display configuration that is accessed from memory. In one embodiment, one or more of the pairing selections of the set of pairing selections are made according to a content display configuration that is accessed from memory. Other embodiments are contemplated by the subject disclosure.

Figure 8:
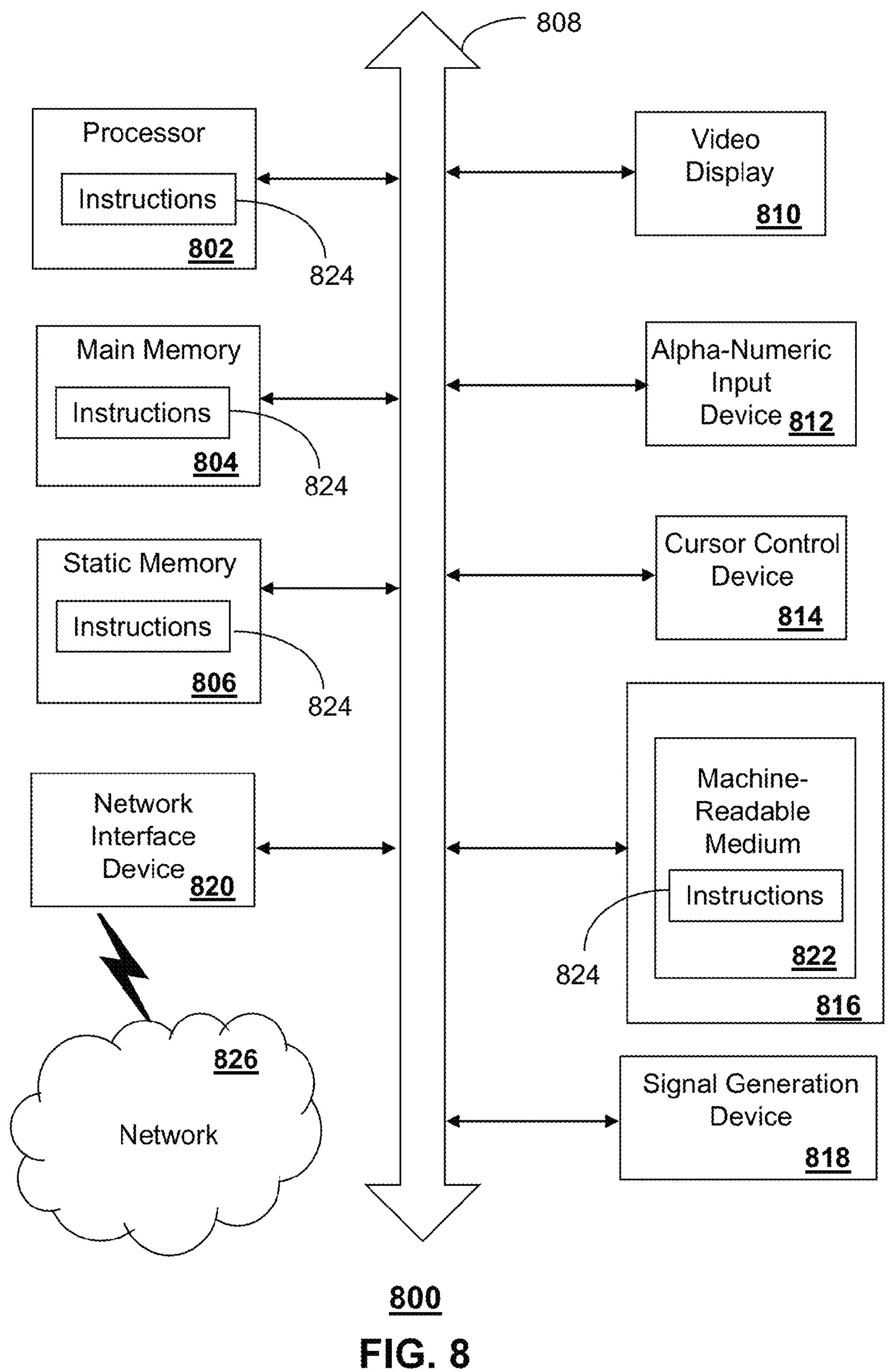
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods discussed above. One or more instances of the machine can operate, for example, as the media server 130, the media processor 106, and/or the mobile communication device 516, and/or other devices of FIGS. 1-6. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. In one embodiment, a listing of available displays for selection at the media processor device 107 is generated based upon detection of displays in communication with the media processor device 107 or display activations.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:

a processor; and a memory that stores executable instructions that, when executed by the processor, facilitate performance of operations, comprising:

receiving a plurality of feed selections from a first listing of a plurality of media content feeds available from a service provider network, wherein the plurality of media content feeds comprise a plurality of camera feeds from a plurality of cameras filming a common event and content associated with the common event, wherein the plurality of media content feeds each comprise a subject area channel comprising a collection of sub-channels associated with the common event available from the service provider network, wherein the collection of sub-channels each comprise a separate, broadcast channel;

receiving a plurality of display selections from a second listing of a plurality of displays that are communicatively coupled to the device;

receiving information regarding an arrangement of each of the plurality of displays;

receiving a plurality of pairing selections, wherein each pairing selection of the plurality of pairing selections comprises an assignment of one sub-channel of the collection of sub-channels associated with the common event paired to one display selection of the plurality of display selections based on the arrangement of each of the plurality of displays;

generating a content display configuration corresponding to the collection of sub-channels associated with the common event, the plurality of display selections, and the plurality of pairing selections;

transmitting a plurality of displayable content streams to the plurality of display selections according to the content display configuration to cause the assigned sub-channels to be presented at respective display devices associated with the plurality of display selections;

modifying the content display configuration according to a received request to modify the content display configuration of one of the sub-channels associated with the common event, the plurality of display selections, the plurality of pairing selections, or any combination thereof; and transmitting the plurality of displayable content streams according to the modifying of the content display configuration.

2. The device of claim 1, further performing operations comprising receiving, during the transmitting of the plurality of displayable content streams, the request to modify the content display configuration.

3. The device of claim 1, further performing operations comprising modifying one feed selection of the plurality of feed selections responsive to the request.

4. The device of claim 1, further performing operations comprising modifying one display selection of the plurality of display selections responsive to the request.

5. The device of claim 1, further performing operations comprising modifying one pairing selection of the plurality of pairing selections responsive to the request.

6. The device of claim 5, wherein a first feed selection of the plurality of feed selections is associated with a first media content feed of a first subject area content collection of the plurality of subject area content collections and a second feed selection of the plurality of feed selections is associated with a second media content feed of a second subject area content collection of the plurality of subject area content collections.

7. The device of claim 1, wherein the plurality of media content feeds are each associated with one subject area content collection of a plurality of subject area content collections available from the service provider network.

8. The device of claim 1, wherein the request to modify the content display configuration is received from a remote controller communicatively coupled to the device.

9. The device of claim 1, further performing operations comprising:

receiving from the service provider network a plurality of content streams according to the content display configuration; and decoding the plurality of content streams that are received to generate the plurality of displayable content streams.

10. The device of claim 1, further performing operations comprising one of enabling or disabling transmitting of a first displayable content stream of the plurality of displayable content streams responsive to the request.

11. The device of claim 1, further performing operations comprising one of enabling or disabling a first display associated with the plurality of display selections responsive to the request.

12. The device of claim 1, wherein the first listing of the plurality of media content feeds comprises an electronic programming guide and wherein the receiving of the plurality of feed selections comprises receiving selections from the electronic programming guide.

13. The device of claim 1, further performing operations comprising:

storing the content display configuration at the memory; and retrieving the content display configuration that is stored in the memory during an initialization of the device.

14. A non-transitory computer-readable storage medium, comprising executable instructions, which, when executed by a processor, facilitate performing of operations comprising:

receiving a plurality of feed selections from a plurality of media content streams available from a service provider network, wherein the plurality of media content streams comprise a plurality of camera feeds from a plurality of cameras filming a common event and content associated with the common event, and wherein the plurality of media content streams comprise a subject area channel comprising a collection of sub-channels associated with the common event available from the service provider network;

receiving information regarding an arrangement of a plurality of available displays;

decoding the plurality of content streams that are received to generate a plurality of displayable content streams;

displaying, at an electronic programming guide, a content display configuration, wherein the content display configuration comprises the plurality of media content streams organized according to the common event available from the service provider network and according to non-collected media content;

receiving a selection of the plurality of media content streams organized according to the common event;

responsive to receiving the selection of the plurality of media content streams organized according to the common event, transmitting the plurality of displayable content streams according to a selected one of the content display configuration to cause selected sub-channels associated with the common event to be presented at selected display devices;

receiving, during the transmitting of the plurality of displayable content streams, a request to modify the content display configuration to display different sub-channels of the collection of sub-channels associated with the common event;

modifying the content display configuration according to the request; and transmitting different sub-channels to selected display devices according to the modifying of the content display configuration.

15. The non-transitory computer-readable storage medium of claim 14, wherein the executable instructions further facilitate the performing of operations comprising:

receiving the plurality of feed selections from a first listing of the plurality of media content feeds available from the service provider network; and receiving a plurality of display selections from a second listing of the plurality of available displays.

16. The non-transitory computer-readable storage medium of claim 14, wherein one display of the plurality of displays comprises a picture-in-picture display.

17. The non-transitory computer-readable storage medium of claim 14, wherein one display of the plurality of displays comprises a display that is accessible by way of a wireless communication link.

18. The non-transitory computer-readable storage medium of claim 14, wherein one media content feed associated with the plurality of feed selections comprises content accessible from an internet protocol website.

19. A method, comprising:

accessing, by a system comprising a processor, a content display configuration corresponding to a plurality of feed selections from a plurality of media content feeds available from a service provider network, a plurality of display selections from a plurality of available displays, wherein the plurality of media content feeds comprise a plurality of camera feeds from a plurality of cameras filming a common event and content associated with the common event, wherein the plurality of media content feeds comprise a subject area channel comprising a collection of sub-channels associated with the common event available from the service provider network, and wherein the collection of sub-channels each comprise a separate, broadcast channel;

displaying the collection of sub-channels as a content subject area in an electronic programming guide;

receiving a selection of sub-channels to display from the content subject area at the electronic programming guide as a content display configuration;

selecting a plurality of pairing selections to assign each sub-channel selection to one display selection of the plurality of display selections according to the content display configuration;

transmitting, by the system, the selected sub-channels to be presented at the selected display selections;

modifying, by the system, the content display configuration as a modified content display configuration according to a request to change one of the sub-channels associated with the common event, the plurality of display selections, the plurality of pairing selections, or any combination thereof; and transmitting, by the system, a plurality of displayable content streams according to the modified content display configuration.

20. The method of claim 19, comprising modifying, by the system, one of a feed selection of the plurality of feed selections, a display selection of the plurality of display selections, or a pairing selection of the plurality of pairing selections responsive to the request.

* * * * *